T. C. WHITING.
GOVERNOR MECHANISM.
APPLICATION FILED JULY 5, 1916.
1,310,170.
Patented July 15, 1919.
FIG. I.
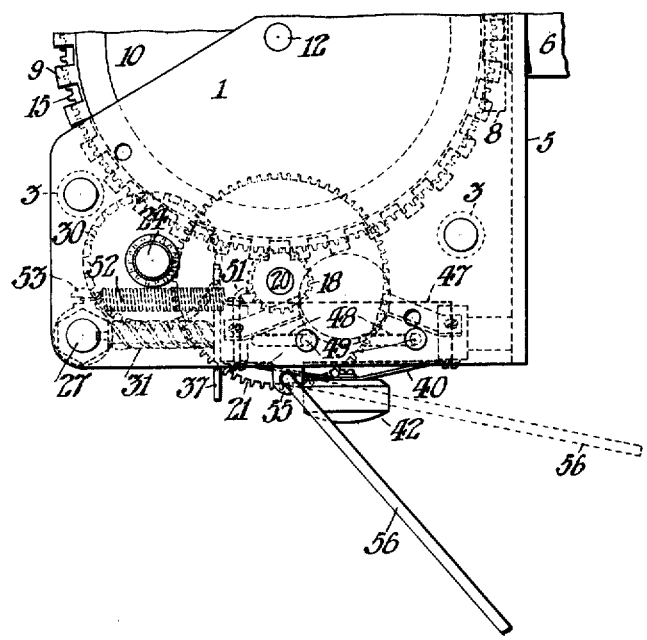
FIG. II.
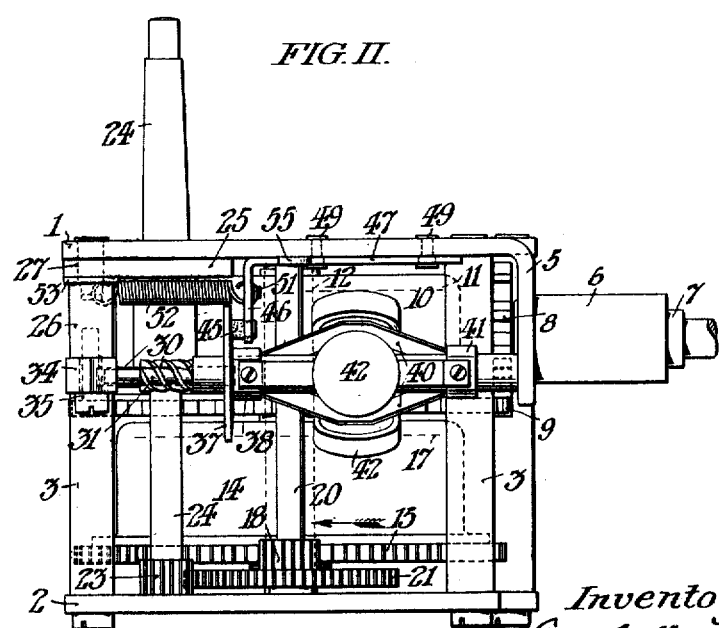
Inventor:
Theo Clifford Whiting,
By Arthur E. Paige,
Attorney.

UNITED STATES PATENT OFFICE.

THEO CLIFFORD WHITING, OF PHILADELPHIA, PENNSYLVANIA.

GOVERNOR MECHANISM.

1,310,170.  Specification of Letters Patent.  Patented July 15, 1919.

Application filed July 5, 1916. Serial No. 107,717.

*To all whom it may concern:*

Be it known that I, THEO CLIFFORD WHITING, a citizen of the United States, residing at Philadelphia, in the State of Pennsylvania, have invented a certain new and useful Improvement in Governor Mechanism, whereof the following is a specification, reference being had to the accompanying drawing.

My invention relates to mechanism of the class wherein a disk carried by a shaft is connected with the latter by means tending to move the disk axially upon the shaft in accordance with the rate of rotation of the latter, and a brake element is spring pressed in contact with said disk to regulate the rate of its rotation. Ordinarily, the brake element of such mechanism is carried by a pivoted support; so the angular relation of said element and disk varies in accordance with the position of the latter, and, consequently, there is an undesirable variation in the co-efficient of friction of said brake element; incident to variations in the area of contact, and in the radial location of the area of contact with reference to the axis of the disk. It is an object of my invention to provide mechanism whereby a brake element shall be pressed in contact with such an axially movable disk, throughout a predetermined range of movement of the latter, without variation in their angular relation; so that the area of contact and its radial location are practically constant.

My invention may be employed with particular advantage in connection with spring motors such as are ordinarily employed in phonograph and gramophone machines. Therefore, I have illustrated a convenient embodiment of my invention in connection with such a motor. However, it is to be understood that I do not desire to limit the application of my invention to motors of that specific class.

My invention includes the various novel features of construction and arrangement hereinafter more definitely specified.

In the drawing; Figure I is a fragmentary plan view of a spring motor embodying my invention.

Fig. II is a side elevation of said motor, including my improved governor mechanism.

In said figures; the motor frame includes the top plate 1 and the bottom plate 2, which are rigidly connected by the standards 3. Said plate 1 has the vertical flange 5 carrying the stationary bearing 6 in which the winding shaft 7 is journaled. Said shaft has, at its inner end, the gear 8 engaging the gear 9 on the spring drum 10 which incases the spring 11 having its outer end attached to said drum and its inner end attached to the spring arbor 12 which is journaled in said frame plates 1 and 2. Said arbor extends, freely, through the spring drum 14 and the gear 15 which is rigidly connected to that drum, but is connected with the inner end of the spring 17 which is incased by said drum 14 and has its outer end connected therewith. The effect of the construction and arrangement aforesaid is that both springs tend to turn said drum 14, with its gear 15, in the direction of the arrow shown in Fig. II. Said gear 15 engages the gear 18 which is rigidly connected with the shaft 20 journaled in said plates 1 and 2 and carrying the gear 21 in engagement with the pinion 23 on the sound record driving shaft 24 which is journaled in said plates 1 and 2 and the reinforcing plate 25 which is rigidly connected with said plate 1 by the stud 26 having the shank 27 extending through them, with its upper end rivet headed upon said plate 1. Said shaft 24 carries the worm gear 30 engaging the worm shaft 31 which is journaled at one end in the frame flange 5 and has its other end journaled in the bearing block 34 which is detachably rigidly connected with said stud 26 by the screw 35; so that said shaft 31 may be adjusted toward and away from said shaft 24.

Said worm shaft 31 carries the friction disk 37 provided with the hub 38 and axially movable on said shaft, with which it is connected by means tending to axially shift said disk in accordance with the rotation of said shaft 31; such means including the three springs 40 each connected at one end to said hub 38, and at its other end to the collar 41 which is rigidly connected with said shaft 31; each of said springs 40 carrying a weight 42 by which it is more or less flexed in accordance with the rate of rotation of said shaft 31.

The arrangement above described is such that as the rate of rotation of said worm shaft 31 increases, said friction disk 37 tends to move toward the right in Fig. II, and such motion is opposed by contact of said disk with the brake block 45, which is conveniently formed of oiled leather detachably mounted in a screw threaded opening in the vertical flange 46 of the slide frame 47. Said frame 47 has longitudinal slots 48 engaging the stationary studs 49 which are riveted in said frame plate 1, and is thus mounted to reciprocate parallel with the axis of said shaft 31; its range of reciprocation being limited by the engagement of said studs 49 in said slots 48. Said slide frame 47 has the laterally extending lug 51 engaging one end of the spring 52 which has its other end connected with the motor frame, by engagement with the washer 53 which is rigidly clamped upon said frame by engagement between said frame stud 26 and reinforcing plate 25, as shown in Fig. II. Said slide frame 47 has the lug 55, projecting beyond the edge of said frame plate 1 as shown in Fig. I for convenient engagement with the connector 56, which may be a rod or a cord, pivotally connected therein so that it may be adjusted to any angular position in which traction upon it may be effective to shift said frame, to the right in said drawing, against the tension of said spring 52; such angular adjustment of said connector 56 being desirable to suit variations in the location of means for actuating it in connection with the casing in which said motor is inclosed.

In the position shown in the drawings; said slide frame 47 is drawn, by the spring 52, to the limit of its movement toward the left, and said brake 45 thus pressed upon said disk 37 so as to prevent rotation of the latter. However, it is to be understood that said slide frame 47 may be shifted more or less toward the right in the drawing, by said connector 56, and that the position to which it is thus adjusted will predetermine and limit the maximum rate of rotation of the shaft 31. That is to say, the maximum limit of rotation of said shaft 31, permitted by the governor mechanism, increases with the increase of movement of said slide 47 toward the right; increase of the predetermined rate being prevented by frictional engagement of said disk 37 with said brake 45 when that rate is reached, and, as said governor mechanism is so constructed and arranged that it may be used to entirely prevent rotation of said shaft 31, (and thus serve as a stop mechanism) said mechanism may be utilized to predetermine any rate of rotation of said shaft 31, and consequently of the shaft 24, up to the maximum of which the motor is capable.

I do not desire to limit myself to the precise details of construction and arrangement herein set forth, as it is obvious that various modifications may be made therein without departing from the essential features of my invention as defined in the appended claims.

I claim:—

1. In a governor mechanism, the combination with a horizontal shaft; of a friction disk having a hub and axially movable on said shaft; means operatively connecting said shaft and disk, tending to axially shift said disk in accordance with the rate of rotation of said shaft, including sheet metal springs detachably connected to said disk hub and to a collar fixed on said shaft, and weights carried by said springs; a slide frame formed of plane sheet metal arranged to reciprocate parallel with the axis of said shaft toward and away from said disk; a brake block, of resilient material, carried by said slide frame and arranged to bear against said disk; a stationary frame having rivet studs extending through said slide frame upholding said slide frame against the action of gravity and limiting its movement; a spring connecting said slide frame with said stationary frame; and an actuating connector, angularly adjustably connected with said slide frame; whereby said slide frame may be shifted in opposition to said spring.

2. In a governor mechanism, the combination with a horizontal shaft; of a friction disk axially movable on said shaft; means operatively connecting said shaft and disk, tending to axially shift said disk in accordance with the rate of rotation of said shaft; a slide frame formed of plane sheet metal arranged to reciprocate horizontally parallel with the axis of said shaft toward and away from said disk; a brake block, of resilient material, carried by said slide frame and arranged to bear against said disk; a stationary frame supporting said slide frame; a spring connecting said slide frame with said stationary frame; and an actuating connector, angularly adjustably connected with said slide frame; whereby said slide frame may be shifted in opposition to said spring, by stress upon said connector in any direction within its range of angular adjustment with respect to the direction of movement of said slide frame, without alteration in the direction of movement of the latter.

3. In a governor mechanism, the combination with a horizontal shaft; of a friction disk axially movable on said shaft; means operatively connecting said shaft and disk, tending to axially shift said disk in accordance with the rate of rotation of said shaft; a slide frame formed of plane sheet metal arranged to reciprocate parallel with the axis of said shaft toward and away from said disk; a brake block, of resilient material, carried by said slide frame and arranged to bear against said disk, a stationary frame supporting said slide frame; a spring tending to shift said stationary frame toward said disk; and an actuating connector, consisting of a rod angularly adjustably connected with said slide frame on a vertical axis; whereby said slide frame may be shifted in opposition to said spring, by stress upon said connector in any direction within its range of angular adjustment with respect to the direction of movement of said slide frame, without alteration in the direction of movement of the latter.

4. In a governor mechanism, the combination with a horizontal shaft; of a friction disk axially movable on said shaft; means operatively connecting said shaft and disk, tending to axially shift said disk in accordance with the rate of rotation of said shaft; a plane slide frame arranged to reciprocate toward and away from said disk; a brake block carried by said slide frame and arranged to bear against said disk; a stationary frame supporting said slide frame; a spring tending to shift said stationary frame toward said disk; and an actuating connector, pivoted upon a vertical axis and thus angularly adjustably connected with said slide frame; whereby said slide frame may be shifted in opposition to said spring, by stress upon said connector in any direction within its range of angular adjustment with respect to the direction of movement of said slide frame, without alteration in the direction of movement of the latter.

5. In a governor mechanism, the combination with a shaft; of a friction disk axially movable on said shaft; means operatively connecting said shaft and disk, tending to axially shift said disk in accordance with the rate of rotation of said shaft; a slide frame arranged to reciprocate toward and away from said disk; a brake block carried by said slide frame and arranged to bear against said disk; a stationary frame supporting said slide frame; immovable means extending through said slide frame limiting its movement; a washer held by said stationary frame, and provided with a spring notch; a tension spring connecting said slide frame with said stationary frame washer notch; and means whereby said slide frame may be shifted in opposition to said spring.

6. In a governor mechanism, the combination with a shaft; of a friction disk axially movable on said shaft; means operatively connecting said shaft and disk, tending to axially shift said disk in accordance with the rate of rotation of said shaft; a slide frame formed of plane sheet metal arranged to reciprocate toward and away from said disk; a brake block carried by said slide frame and arranged to bear against said disk; a stationary frame supporting said slide frame; immovable means extending through said slide frame limiting its movement; a tension spring tending to shift said slide frame toward said disk; and means whereby said slide frame may be shifted in opposition to said spring.

7. In a governor mechanism, the combination with a shaft; of a friction disk axially movable on said shaft; means operatively connecting said shaft and disk, tending to axially shift said disk in accordance with the rate of rotation of said shaft; a slide frame arranged to reciprocate toward and away from said disk; a brake block carried by said slide frame and arranged to bear against said disk; a stationary frame supporting said slide frame; a tension spring tending to shift said slide frame horizontally toward said disk; and stationary means, distinct from said slide frame and independent of said spring, limiting the movement of said slide frame.

8. In a governor mechanism, the combination with a shaft; of a friction disk axially movable on said shaft; means operatively connecting said shaft and disk, tending to axially shift said disk in accordance with the rate of rotation of said shaft; a stationary frame having a plane slide bearing; a slide frame, having a plane surface fitted to said slide bearing, arranged to reciprocate toward and away from said disk; a plurality of stationary elements, in spaced relation, supporting said slide frame in coöperative relation with said stationary frame, determining the direction of its freedom of movement, and limiting its sliding movement; a brake block carried by said slide frame and arranged to bear against said disk; and means whereby said slide frame may be shifted in either direction.

9. In a governor mechanism, the combination with a shaft; of a friction disk having a hub and axially movable on said shaft; means operatively connecting said shaft and disk, tending to axially shift said disk in accordance with the rate of rotation of said shaft, including sheet metal springs detachably connected to said disk hub and to a collar fixed on said shaft, and weights carried by said springs; a slide frame arranged to reciprocate parallel with the axis of said shaft toward and away from said disk; a brake block, of resilient material, carried by said slide frame and arranged to bear against said disk; a stationary frame having rivet studs extending through said slide frame in spaced relation, supporting said slide frame in coöperative relation with said stationary frame, determining the direction of its freedom of movement and limiting its movement; and a spring connecting said slide frame with said stationary frame.

10. In a governor mechanism, the combination with a stationary frame including a plate 1 and stud 26; of a washer 53 rigidly held between said plate and stud, and provided with a spring notch; a thrust bearing carried by said stud; a shaft journaled in said thrust bearing; a friction disk axially movable on said shaft; a brake member arranged to coöperate with said friction disk; and a tension spring connecting said brake member with the notch in said washer.

11. An article of manufacture for a governor mechanism; consisting of a slide frame of pressed sheet metal having slots for securing means, a screw threaded opening for a brake block, and means to engage the terminal coil of a spring.

In testimony whereof, I have hereunto signed my name at Philadelphia, Pennsylvania, this fourteenth day of June, 1916.

THEO CLIFFORD WHITING.

Witnesses:
ARTHUR E. PAIGE,
ANNA ISRAELUTZ.

Copies of this patent may be obtained for five cents each, by addressing the "Commissioner of Patents, Washington, D. C."